ns Patent [19]

Durbin

[11] 3,820,565
[45] June 28, 1974

[54] AUTOMATIC SAFETY CUTOFF VALVE
[76] Inventor: Arland J. Durbin, 9975 Rosemere St., Elyria, Ohio 44035
[22] Filed: July 26, 1972
[21] Appl. No.: 275,263

[52] U.S. Cl............... 137/614.2, 137/517, 251/265
[51] Int. Cl........................................... F16k 17/168
[58] Field of Search........... 137/517, 614.2, 614.11, 137/614.12, 614.13, 614.14, 614.16, 614.17, 614.18, 614.19, 614.21, 613, 329.4; 251/218, 275, 276, 278, 265

[56] References Cited
UNITED STATES PATENTS

| 502,128 | 7/1893 | Marshall | 251/276 |
|---|---|---|---|
| 1,060,142 | 4/1913 | Stevens | 137/517 X |
| 1,203,371 | 10/1916 | Lowe | 251/265 |
| 1,548,098 | 8/1925 | Raymond | 137/614.2 X |
| 2,404,924 | 7/1946 | Sacchini | 137/614.2 X |
| 2,500,156 | 3/1950 | Dechant | 137/614.2 X |
| 2,563,244 | 8/1951 | Holicer | 137/613 X |
| 2,819,799 | 1/1958 | Wilkerson | 137/517 X |
| 3,119,407 | 1/1964 | Timmerman et al. | 137/517 X |
| 3,191,616 | 6/1965 | Kochner | 137/614.2 X |
| 3,387,622 | 6/1968 | Weinstein | 137/614.2 X |

Primary Examiner—William R. Cline
Assistant Examiner—Ira S. Lazarus
Attorney, Agent, or Firm—Clarence A. O'Brien; Harvey B. Jacobson

[57] ABSTRACT

An automatic safety cutoff valve having a housing arrangeable in a fluid flow path and a valve element movably arranged in a passageway of the housing. Spring elements are arranged on upstream and downstream sides of the valve element for biasing them toward a stable valve open position when pressures on the upstream and downstream sides of the valve element are substantially equal. This position becomes unstable when the downstream pressure is substantially less than the upstream pressure, causing the valve element to move to a valve closed position blocking flow in the flow path. The cutoff valve may be used in conjunction with a selectively actuatable on-off valve to provide a dual-purpose system.

8 Claims, 4 Drawing Figures

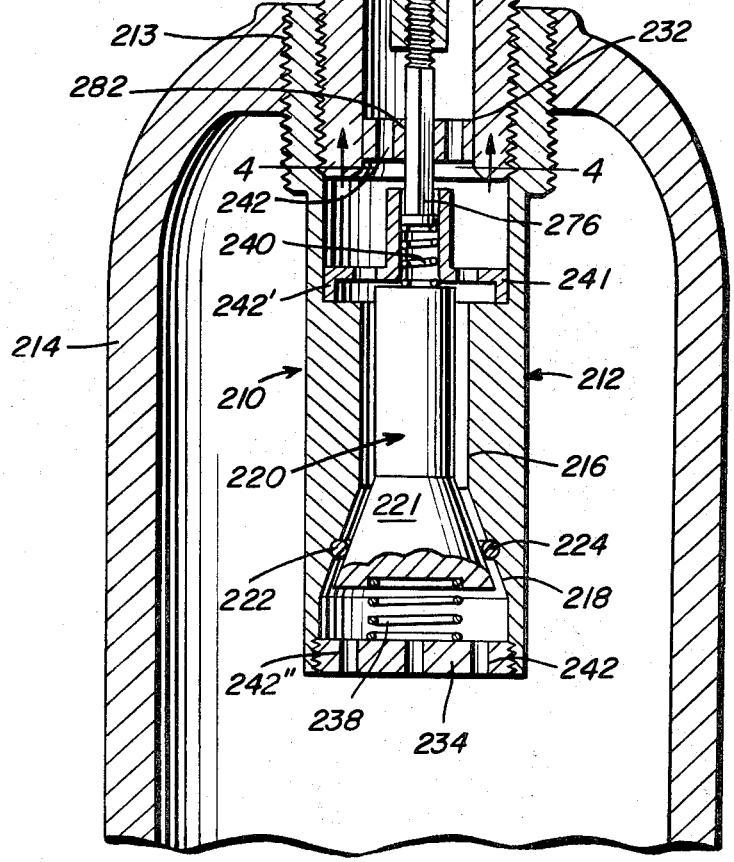
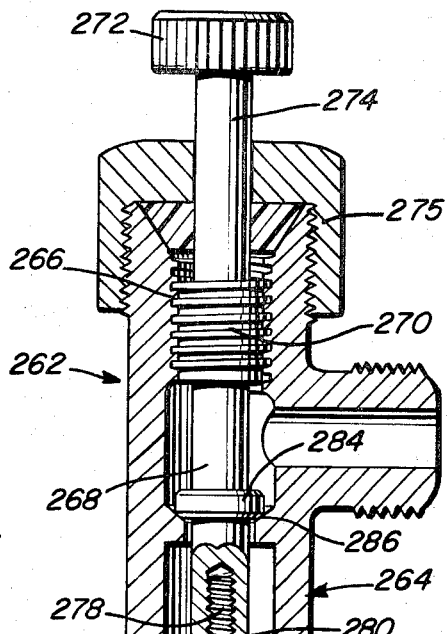
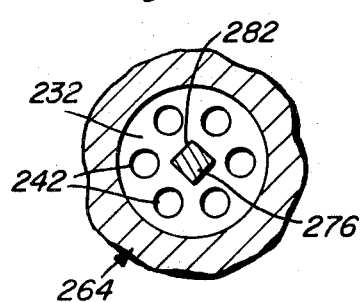

AUTOMATIC SAFETY CUTOFF VALVE

BACKGROUND OF THE INVENTION

1. Field of the Invention

This invention relates to flow control valves, and in particular to an automatic safety cutoff valve which will respond to a substantial drop in pressure on the downstream side of the valve by moving to a closed position and blocking flow through the valve.

2. Description of the Prior Art

When conveying fluids, and particularly combustible gases, along a pipeline and the like it is both desirable and customary to insert a cutoff valve into the line for blocking the line in the event of either a break in the line downstream or a stoppage of flow upstream of the valve.

SUMMARY OF THE INVENTION

It is an object of the present invention to provide an improved safety cutoff valve which is responsive to a substantial decrease in pressure on its downstream side as would result from the bursting of a gas line and the like.

It is also an object of the present invention to provide a pressure controlled, safety cutoff valve which will also function to vary the rate of flow passing therethrough.

These and other objects are achieved according to the present invention by providing an automatic safety cutoff valve having a housing arrangeable in a flow path and provided with walls defining a passageway. A valve element is movably arranged in the passageway, and resilient elements mount the valve element for positioning same in a position permitting flow through the passageway when pressures on an upstream and a downstream side of the valve element are substantially equal, and permitting movement of the valve element to a position blocking flow through a passageway when a pressure in the flow path downstream of the valve element is substantially less than a flow path pressure upstream of the valve element. Advantageously, the resilient elements are arranged on the ustream and downstream sides of the valve element, and bias same in opposed directions.

According to preferred embodiments of the present invention, the upstream and downstream sides of the valve element have a longitudinal member extending therefrom. These members are guidingly received in openings provided in plates arranged in the housing, while the resilient elements are coil springs arranged about the longitudinal members and between the valve element and plate. The rate of flow through the passageway may be varied by providing an arrangement for selectively varying the deflection of one of the springs for adjusting the position of the valve element within the passageway.

One preferred embodiment for varying the deflection of one of the springs entails a combination of a safety cutoff valve according to the present invention with a further valve, such as a manual valve, which also controls fluid flow. By placing a portion of the valve member of this further valve in contact with the spring to be adjusted, movement of the valve member will cause an adjustment of the associated spring and a repositioning of the valve element.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmentary, vertical sectional view showing a third embodiment of a safety cutoff valve according to the present invention in combination with a further valve and a compressed gas container.

FIG. 4 is a fragmentary, sectional view taken generally along the line 4—4 of FIG. 3.

DESCRIPTION OF THE PREFERRED EMBODIMENTS

Figure 1:
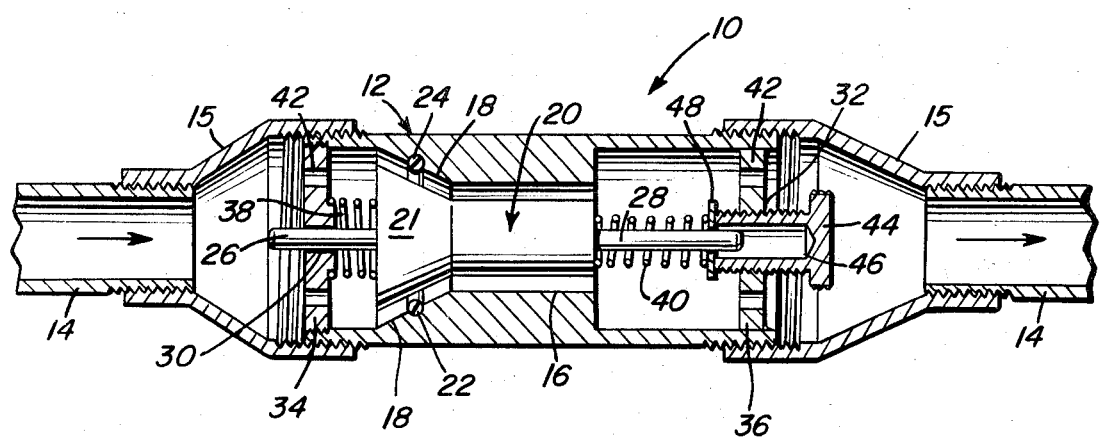
FIG. 1 is a fragmentary, vertical longitudinal sectional view showing a first embodiment of a safety cutoff valve according to the present invention.

FIG. 1 of the drawings shows an automatic safety cutoff valve 10 according to the present invention having a housing 12 arrangeable in a flow path such as that defined by a pipeline 14 connected thereto in a known manner as by adapters 15, and having walls defining a passageway 16 therein. Housing 12 is provided with a valve set 18 having a surface in the form of a frustum of a cone. A valve element 20 is movably arranged in passageway 16, and has a portion 21 also in the form of a frustum of a cone and arranged for mating with valve seat 18. A groove 22 forming an annular surface is advantageously provided in valve seat 18, and a resilient annular member such as an O-ring 24 may be arranged in groove 22 for providing a seal between valve element 20 and valve seat 18 when valve element 20 is in a flow-blocking position (not shown) as well as a restricted throat when valve element 20 is in a flow-permitting position (FIG. 1).

Valve element 20 is mounted in passageway 16 as by structure to be described below which positions same for permitting flow through passageway 16 when presures on the upstream and downstream sides of element 20, as designated by the arrows in FIG. 1, are substantially equal, and permits element 20 to move to a position blocking flow when the downstream pressure is substantially less than the upstream pressure.

The upstream and downstream sides of element 20 have a longitudinal member such as rods 26, 28, extending therefrom and arranged to be guidingly received in openings 30, 32 of plates 34, 36, respectively. Resilient members such as coiled compression springs 38, 40 are arranged over a respective rod 26, 28, and between the adjacent side of valve element 20 and a respective plate 34, 36 for biasing element 20 in opposed directions. As long as the total forces, the sum of the spring and flow forces, on either side of element 20 are substantially equal, element 20 will be balanced and remain in a predetermined position. Ports 42 are provided in plates 34, 36 for permitting fluid flow therethrough.

A threaded plug 44 threadingly engages with threads formed in opening 32 to provide an arrangement for selectively varying the deflection of the spring 40 and adjusting the position of element 20. Plug 44 has a bore 46 defined therein for receiving rod 28, and a plate 48 is arranged over the open end of bore 46 for providing an abutment surface for spring 40.

The operation of valve 10 may easily be understood by referring to FIG. 1 of the drawings and the above description. With a flow through pipeline 14 in the direction of the flow arrows shown in FIG. 1, a substantial decrease in pressure on the downstream side of valve element 20 due to a broken or ruptured line 14 and the like will result in greater pressure on the upstream side of element 20 than at the downstream side, increased flow through passageway 16 because of the pressure differential, and a throttling effect at ring 24. As a result, element 20 will move to the right as seen in FIG. 1 until portion 21 seats against ring 24 and blocks passageway 16. In the embodiment shown in FIG. 1, plug 44 is adjusted in a known manner to a predetermined stable position prior to installation of valve 10 so as to provide a desired rate of flow when valve element 20 is in its illustrated open position.

Figure 2:
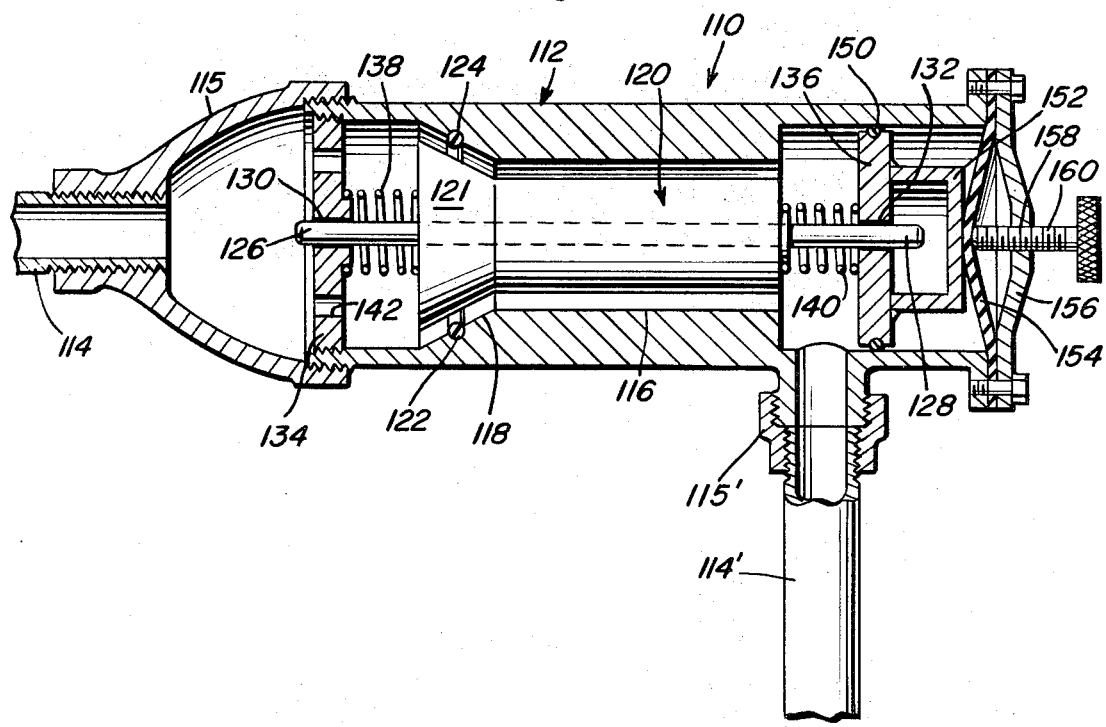
FIG. 2 is a fragmentary, vertical longitudinal sectional view showing a second embodiment of a safety cutoff valve according to the present invention.

Referring now to FIG. 2 of the drawings, a valve 110 according to the present invention has a housing 112 arranged in a pipeline 114, 114' as by adapters 115, 155'. A passageway 116 is defined in housing 110, and has a valve seat 118 provided with a groove 122 in which an O-ring 124 is arranged in a manner similar to that for valve 10. Further, valve 110 has rods 126, 128 guidingly received in openings 130, 132 of respective plates 134, 136, also in the manner of valve 10. Coiled compression springs 138, 140 provide the bias on element 120. Plate 134 is provided with ports 142 which function in the manner of ports 42 of valve 10.

Spring 140 of valve 110 is adjusted by movement of plate 136 which slidingly and sealingly engages with housing 112 as by an O-ring 150 arranged in a groove in the periphery of plate 136. A bracket 152 extends from one surface of plate 136, and forms a cavity for receiving the end of rod 128. A diaphragm 154, which may be constructed from a suitable known resilient material, covers the adjacent end of housing 112 and is connected thereto as by a plate 152 provided with a threaded opening 158 for receiving a thumb screw 160. Turning of thumb screw 160 in opening 158 results in longitudinal movement of the threaded portion thereof with a resulting displacement of diaphragm 154. The end of the threaded shaft of thumb screw 160 contacts bracket 152 through the intermediary of diaphragm 154, with the result that a longitudinal displacement of thumb screw 160 will displace bracket 152, plate 136 and spring 140.

The operation of valve 110 is the same as that of valve 10, with the exception that the flow rate through valve 110 may be adjusted after installation of same in a pipeline.

FIGS. 3 and 4 of the drawing show a valve 210 according to the present invention having a housing 212 mounted in an opening 213 of a compressed fluid container 214. A, for example, manually operated valve 262 has a hollow valve housing 264 mounted to housing 212 within opening 213. Both the mounting of housing 212 and 264 may be done in a suitable, known manner, as by the illustrated screw threads. Valve housing 264 is provided with internal screw threads 266 and a valve member 268 having a portion 270 provided with screw threads arranged to threadingly engage with the threads 266 for selective displacement of member 268 relative to valve housing 264. Member 268 is also provided with a knob 272 at the end of an extension 274 thereof. Extension 274 extends through a threadingly mounted cap 275 arranged at the upper end of housing 268.

A longitudinal member, which may be in the form of a square shaft 276 (FIG. 4), is arranged extending away from member 268 and contacting a spring 240 arranged in a guide 241 having ports 242. Member 276 is provided with screw threads 278 of a reverse convention with respect to threads 266, such as for example left-hand threads, and is in threading engagement with similar threads formed in a bore 280 provided in member 268. A plate 232 provided with ports 242' is arranged at the lower end of housing 264, and is also provided with an opening 282 having a configuration matching the cross section of shaft 276 for guidingly receiving and preventing rotation of same. By restraining rotation of shaft 276 about its longitudinal extent relative to valve member 268, shaft 276 will be caused to be displaced along its longitudinal extent when valve member 268 is displaced in valve housing 264 as by rotating knob 272. Further, by providing, for example, twice as many threads 278 per inch as threads 266, a displacement of member 276 along its longitudinal extent with respect to housing 212 may be achieved. This will result in a change in the deflection of spring 240 and a change in position of a valve element 220. A spring 238 provided with ports 242" is seated against a plate 234 and biases valve element 220 in the opposite direction to spring 240. In this manner and by proper design, it can be arranged so that portion 221 of valve element 220 will be seated against a ring 224 arranged in a groove 222 provided on valve seat 218 when portion 284 of valve member 268 is seated against valve seat 286 of valve housing 264. This will ensure complete closure of the passage from the interior of container 214 through valves 210 and 262.

Operation of valve 210 is the same as for valve 110, except for the addition of manual valve 262.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An automatic safety cutoff valve, comprising in combination:

a. a housing arrangeable in a flow path and having walls defining a passageway;

b. a valve element movably arranged in the passageway;

c. means including resilient elements arranged on the upstream and downstream sides of said valve element and biasing same toward one another for mounting said valve element in the passageway for positioning same in a position permitting flow through the passageway when pressures on an upstream side and a downstream side of said valve element are substantially equal, and permitting movement of said valve element to a position blocking flow when a pressure in the flow path downstream of said valve element is substantially less than a flow path pressure upstream of said valve element; and d. means for selectively varying the deflection of one of the resilient elements for adjusting the position of the valve element and including a further valve arranged in contact with said one resilient element for controlling fluid flow by the valve element as a function of the setting of the valve, said further valve having a hollow valve housing provided with internal screw threads and a valve member having a portion provided with screw threads arranged to threadingly engage with the valve housing screw threads for selective displacement of the valve member relative to the valve housing, a longitudinal member extending away from said valve member and contacting the resilient element, said member provided with screw threads of a reverse convention with respect to the housing threads and threadingly engageable with similar threads formed in a bore provided in said valve member, and means for restraining said member from movement about the longitudinal extent of same and causing said member to be displaced along its longitudinal extent when said valve member is displaced in said valve housing.

2. Apparatus as defined in claim 1, still further including a compressed fluid container provided with an opening, and wherein said valve housing is arranged in the opening.

3. Apparatus as defined in claim 2, wherein said housing is mounted in the opening, and said valve housing is mounted on said housing.

4. Apparatus as defined in claim 1, wherein said housing is provided with a valve seat having a surface in the form of a frustum of a cone, and said valve element has a portion also in the form of a frustum of a cone and arranged for mating with the valve seat.

5. Apparatus as defined in claim 1, wherein said valve seat is provided with a groove forming an annular surface, and further including a resilient annular ring arranged in the groove for providing a seal between the valve element and valve seat when said valve element is in a flow blocking position, and a restricted throat when said valve element is in a flow permitting position.

6. Apparatus as defined in claim 1, wherein each valve element side has a longitudinal member extending therefrom, means are arranged in said housing for providing openings for guidingly receiving the longitudinal member, and the resilient elements ar arranged between a respective valve element side and opening providing means.

7. Apparatus as defined in claim 6, wherein each resilient element is a coiled compression spring arranged over a respective longitudinal member.

8. Apparatus as defined in claim 7, wherein means are provided for selectively varying the deflection of one of said springs for adjusting the position of the valve element.

* * * * *